(12) United States Patent
Nichols et al.

(10) Patent No.: US 10,826,848 B2
(45) Date of Patent: Nov. 3, 2020

(54) BALANCED, OPPORTUNISTIC MULTICORE I/O SCHEDULING FROM NON-SMP APPLICATIONS

(71) Applicant: NETAPP, INC., Sunnyvale, CA (US)

(72) Inventors: Charles E. Nichols, Wichita, KS (US); Scott Terrill, Wichita, KS (US); Don Humlicek, Wichita, KS (US); Arindam Banerjee, Superior, CO (US); Yulu Diao, Bel Aire, KS (US); Anthony D. Gitchell, Derby, KS (US)

(73) Assignee: NETAPP, INC., Sunnyvale, CA (US)

( * ) Notice: Subject to any disclaimer, the term of this patent is extended or adjusted under 35 U.S.C. 154(b) by 215 days.

(21) Appl. No.: 15/497,744

(22) Filed: Apr. 26, 2017

(65) Prior Publication Data

US 2018/0113738 A1    Apr. 26, 2018

Related U.S. Application Data

(60) Provisional application No. 62/411,923, filed on Oct. 24, 2016.

(51) Int. Cl.
| | |
|---|---|
| G06F 9/46 | (2006.01) |
| H04L 12/861 | (2013.01) |
| G06F 9/50 | (2006.01) |
| G06F 12/0842 | (2016.01) |
| G06F 9/48 | (2006.01) |

(52) U.S. Cl.
CPC .......... *H04L 49/90* (2013.01); *G06F 9/4881* (2013.01); *G06F 9/5027* (2013.01); *G06F 12/0842* (2013.01); *G06F 2209/483* (2013.01)

(58) Field of Classification Search
CPC ..... H04L 47/522; H04L 45/16; H04L 47/624; H04L 67/2842; H04L 49/90; G06F 9/5027; G06F 9/546; G06F 9/4881; G06F 2009/483; G06F 12/0842
See application file for complete search history.

(56) References Cited

U.S. PATENT DOCUMENTS

| | | | |
|---|---|---|---|
| 7,243,354 B1 * | 7/2007 | Chhabra | G06F 9/546 718/100 |
| 8,196,147 B1 * | 6/2012 | Srinivasan | H04L 67/2842 711/118 |
| 2003/0061332 A1 * | 3/2003 | Narad | H04L 45/16 709/223 |

(Continued)

*Primary Examiner* — Tuan A Vu
(74) *Attorney, Agent, or Firm* — Haynes and Boone, LLP (57) ABSTRACT

A system for dynamically configuring and scheduling input/output (I/O) workloads among processing cores is disclosed. Resources for an application that are related to each other and/or not multicore safe are grouped together into work nodes. When these need to be executed, the work nodes are added to a global queue that is accessible by all of the processing cores. Any processing core that becomes available can pull and process the next available work node through to completion, so that the work associated with that work node software object is all completed by the same core, without requiring additional protections for resources that are not multicore safe. Indexes track the location of both the next work node in the global queue for processing and the next location in the global queue for new work nodes to be added for subsequent processing.

18 Claims, 8 Drawing Sheets

(56) References Cited

U.S. PATENT DOCUMENTS

2011/0289179 A1* 11/2011 Pekcan ................ H04L 47/522
709/213
2014/0064291 A1* 3/2014 Biswas ................ H04L 47/624
370/412

* cited by examiner

BALANCED, OPPORTUNISTIC MULTICORE I/O SCHEDULING FROM NON-SMP APPLICATIONS

CROSS-REFERENCE TO RELATED APPLICATIONS

This application claims priority to U.S. Provisional Application No. 62/411,923, filed on Oct. 24, 2016, which is incorporated herein by reference in its entirety.

TECHNICAL FIELD

The present description relates to data storage systems, and more specifically, to systems, methods, and machine-readable media for dynamically configuring and scheduling input/output (I/O) workloads among processing cores to improve core utilization and efficiency.

BACKGROUND

Multi-core processors include two or more processing units integrated on an integrated circuit die or onto multiple dies in a chip package. These processing units are referred to as "CPU cores" or "cores." The cores of a multi-core processor may all run a single OS, with the workload of the OS being divided among the cores, where any processor may work on any task so long as any one task is run by a single processor at any one time. This configuration, where the cores run the same OS, is referred to as symmetric multiprocessing (SMP).

When a code base initially designed for single processor operation of a storage controller (a "non-SMP application") has been modified for multiprocessing capability, the possibility arises that specific sections of the application code and/or data structures may be subject to the risk of concurrent access from multiple CPU cores. Approaches to protect against this problem typically impart significant amounts of overhead to the operation of the storage controller, which reduces the storage controller's efficiency.

Further, some approaches statically map certain operations (i.e., I/O processing) to particular cores in a multi-core environment. Thus, certain types of work, or in other words certain software components, will be processed by the scheduler task only on a given single CPU core, and each CPU core's scheduler task only picks up work from its dedicated work queue. Though this may protect against the risk of concurrent access from multiple CPU cores, it can lead to I/O workload-induced CPU core utilization imbalance. With such imbalance, some of the CPU cores may remain underutilized while other CPU cores, with statically assigned operations, may become bottlenecks to optimized performance.

Accordingly, the potential remains for improvements that harness multiprocessing for existing code bases designed for single-core environments that allow for dynamic balancing of CPU workloads in a multiprocessor environment.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for dynamically configuring and scheduling input/output (I/O) workloads among processing cores to improve core utilization and efficiency in a multi-core storage system. According to embodiments of the present disclosure, tasks, queues, and other resources for software objects of an application may be grouped together where they are not multicore-safe and are related to each other. Thus, for example, for a channel for I/O processing, the tasks, queues, and other resources associated with that channel may be grouped together into a work node software object.

When a software component needs to schedule I/O processing work, it takes the work node software object in which the work is wrapped and adds the work node software object to a global queue. The global queue may be a simple queue, a collection of queues, or a collection of tiers of queues, any of which are configured to be multicore-safe according to embodiments of the present disclosure. For example, the collection of queues may be organized by queue heads in the global queue, and when a scheduler accesses a queue head it pulls all of the work node software objects associated with that particular queue head.

This global queue is accessible by the schedulers for the CPU cores in the storage system. Instead of rigidly assigning particular work to specific CPU cores, according to embodiments of the present disclosure any available CPU core may access the global queue and pull the next available work node software object from the global queue to process (or multiple work node software objects, where the global queue is a collection of queue heads). The CPU cores that pull the work node software objects then process those objects through to completion, so that the work associated with that work node software object is all completed by the same CPU core, without requiring additional protections for resources that are not multicore safe.

Indexes may be used to track the location of both the next work node software object in the global queue for processing and the next location in the global queue for new work node software objects to be added for subsequent processing. In this manner, multicore locks are not required when removing objects from the global queue because other CPU cores adding work node software objects do so at different queue indexes.

As a result, embodiments of the present disclosure improve upon storage system technology. For example, embodiments of the present disclosure enable storage systems to more efficiently process I/O by dynamically balancing CPU workload to under-utilized CPU cores. Further, and because of this, storage systems may more efficiently execute applications in a multicore environment, even where the tasks do not enjoy multicore protection. This therefore allows the use of multiple CPU cores in order to provide higher storage system performance while utilizing CPU resources in a more balanced fashion.

Figure 1:
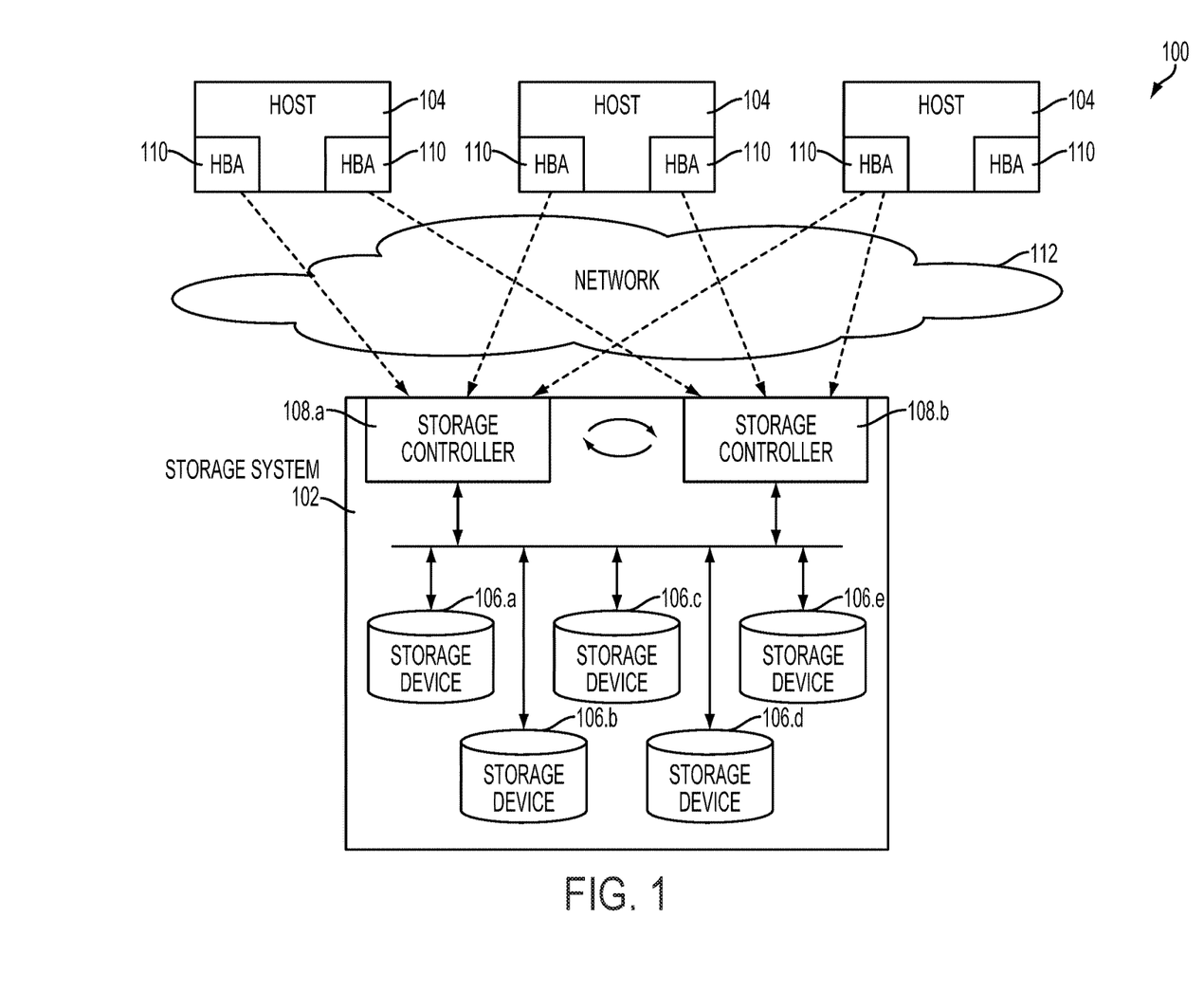
FIG. 1 is an organizational diagram of an exemplary data storage architecture according to aspects of the present disclosure.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to opportunistically schedule I/O workload, such as for non-SMP applications.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indicator to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. According to embodiments of the present disclosure, at least one processor of one or both of the storage controllers 108.a and 108.b may include multiple CPU cores as a multi-core processor. These multiple CPU cores are configured to execute one or more application tasks that have been combined into different work node software objects and placed on a queue for the next available CPU core, according to aspects of the present disclosure discussed in more detail with respect subsequent figures below.

The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106.a, 106.b, 106.c, 106.d, and 106.e (collectively, 106) and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance. The number of storage devices 106.a, 106.b, 106.c, 106.d, and 106.e are for illustration purposes only; more or fewer may be included in storage system 102.

The storage system 102 may group the storage devices 106 for speed and/or redundancy using a virtualization technique such as RAID or disk pooling (that may utilize a RAID level, for example DDP, where volume data, protection information, and spare capacity are distributed across all of the storage devices included in the pool). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniB and, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), a Storage Attached Network (SAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A SAN device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CIFS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different data transaction protocols.

Figure 2:
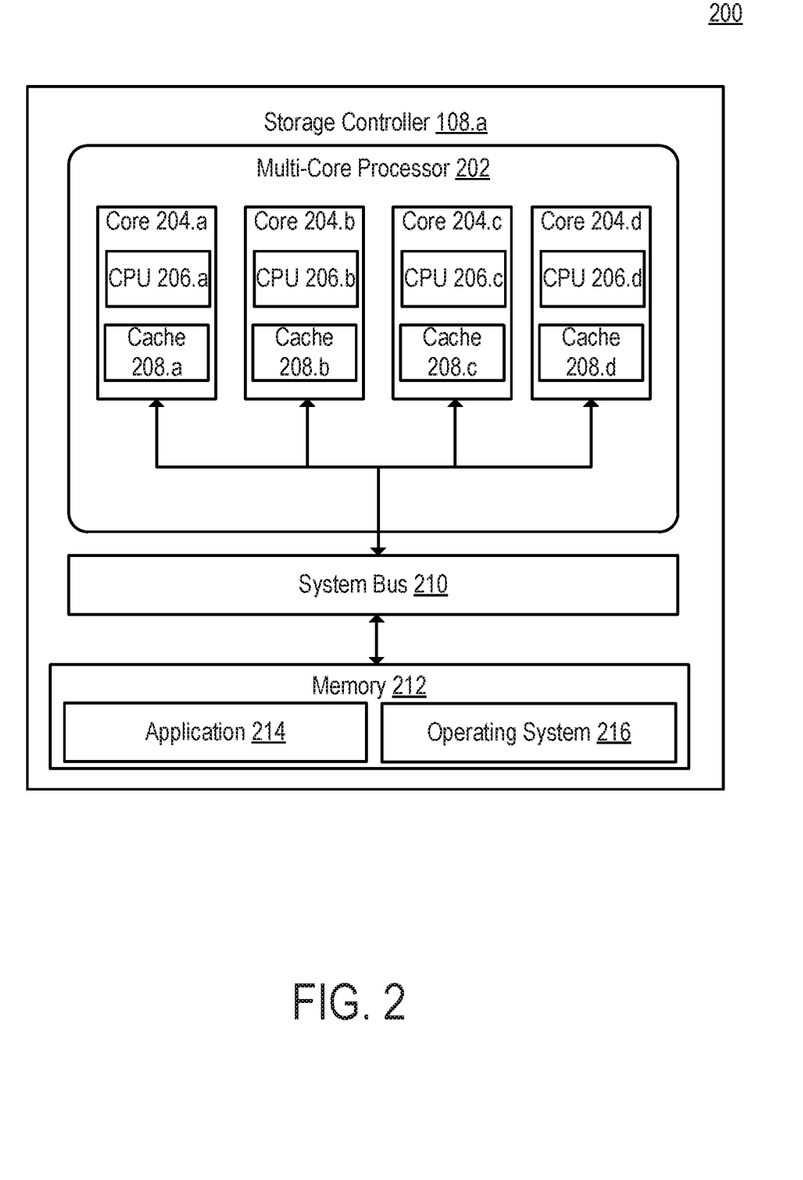
FIG. 2 is an organizational diagram of an exemplary storage controller architecture according to aspects of the present disclosure.

FIG. 2 is an organizational diagram of an exemplary storage controller architecture 200 according to aspects of the present disclosure. For example, the storage controller architecture 200 may be exemplary of either or both of storage controllers 108.a and 108.b of FIG. 1. Reference will be made to storage controller 108.a herein for simplicity.

As shown in FIG. 2, the storage controller 108.a includes a multi-core processor 202. The multi-core processor 202 may include a microprocessor, a plurality of microprocessor cores, a microcontroller, an application-specific integrated circuit (ASIC), a central processing unit (CPU), a digital signal processor (DSP), a controller, a field programmable gate array (FPGA) device, another hardware device, a firmware device, or any combination thereof. In the present example, as shown in the illustration, the multi-core processor 202 includes multiple cores 204.a, 204.b, 204.c, 204.d. The term multi-core processor includes any processor, such as a dual-core processor, that includes two or more cores. The number of cores illustrated in FIG. 2 is for example only; fewer (e.g., two) or more (e.g., any number such as six, eight, ten, or more) cores 204 may be included without departing from the scope of the present disclosure. The multi-core processor 202 may also be implemented as a combination of computing devices (e.g., several multi-core processors, a plurality of microprocessors, one or more microprocessors in conjunction with a multi-core processor, or any other such configuration).

While the multi-core processor 202 is referred to as a singular entity, the storage controller 108.a may include any number of multi-core processors, which may include any number of cores. For example, storage controller 108.a may include several multi-core processors, each multi-core processor having a plurality of cores.

In the present example, the cores 204.a, 204.b, 204.c, 204.d each include independent CPUs 206-core 204.a includes CPU 206.a, core 204.b includes CPU 206.b, core 204.c includes CPU 206.c, and core 204.d includes CPU 206.d. Further, as illustrated in FIG. 2 each core 204 includes a cache 208-core 204.a includes cache 208.a, core 204.b includes cache 208.b, core 204.c includes cache 208.c, and core 204.d includes cache 208. The caches 208 may be, for example, L1 cache. Further, in some examples, cores 204.a, 204.b, 204.c, 204.d may share one or more caches (e.g., an L2 cache). The cores 204 may be integrated into a single integrated circuit die or into multiple dies of a single chip package.

The multi-core processor 202 may be coupled to a memory 212 via a system bus 210. One or more intermediary components, such as shared and/or individual memories (including buffers and/or caches) may be coupled between the cores 204.a, 204.b, 204.c, 204.d and the memory 212. Memory 212 may include DRAM, HDDs, SSDs, optical drives, and/or any other suitable volatile or non-volatile data storage media. Memory 212 may include an operating system 216 (e.g., VxWorks, LINUX, UNIX, OS X, WINDOWS) and at least one application 214, which includes instructions that are executed by the multi-core processor 202. For example, the operating system 216 may run system tasks to perform different functions like I/O scheduling, event handling, device discovery, peering, health checks, etc. According to embodiments of the present disclosure, reference to the operating system 216 may include reference to one or more tasks of one or more applications that may be logically grouped together into work node software objects, as discussed in more detail below.

Multi-core processor 202 executes instructions of the application 214 and/or operating system 216 to perform operations of the storage controller 108.a, including processing transactions initiated by hosts (e.g., hosts 104, server 114, or other devices within storage system 102). The application 214 and the operating system 216 may each be broken down into a discrete amount of tasks. For example, an application 214 may be broken down into multiple tasks based on their similarity to each other, encapsulated as described herein with respect to FIG. 3 into work node software objects.

Each core 204.a, 204.b, 204.c, and 204.d may be configured to execute one or more application and/or system tasks (e.g., from the application 214 and the operating system 216, respectively). A task may include any unit of execution. Tasks may include, for example, threads, processes and/or applications executed by the storage controller 108.a. In some examples, a task may be a particular transaction that is executed on behalf of a host such as querying data, retrieving data, uploading data, and so forth. Tasks may also include portions of a transaction. For example, a query of a data store may involve sub-parts that are each a separate task.

In the present example, application 214 includes one or more tasks that are combined into related work node software objects. For example, tasks related to a fibre channel may be grouped together, and another to a cache pool as just a few examples. These work node software objects are placed in a global queue, which each of the cores 204.a-204.d have access to. As a core 204 becomes available, it may access the next available work node software object to process it in its entirety, therefore allowing a dynamic, opportunistic scheduling of tasks among multiple cores 204.a-204.d. When a core 204 is scheduled with the tasks of a work node software object, it may complete the set (or sets) of operations associated with that object before allowing another task to run on that core 204.

There may be any number of applications 214 stored and/or running at any given time at the storage controller 108.a. The application 214 may be run on top of the operating system 216. In some examples, the storage controller 108.a may implement multiprocessing after an initialization process (e.g., after initializing an operating system or a particular application).

Figure 3:
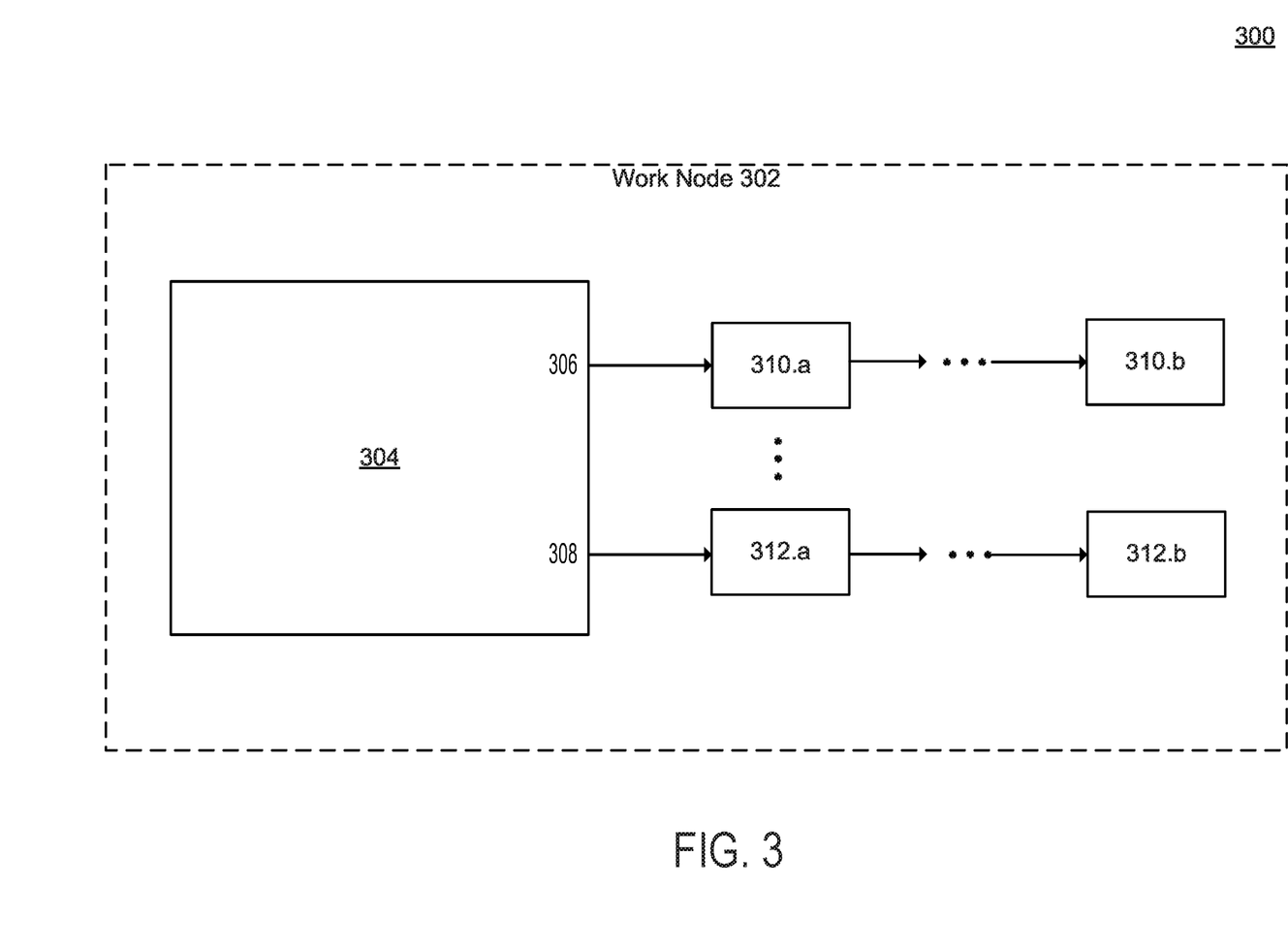
FIG. 3 is an organization diagram that illustrates a work node software object according to aspects of the present disclosure.

An example of tasks being combined into related work node software objects is illustrated in FIG. 3, which is an organization diagram that illustrates a work node software object according to aspects of the present disclosure. In particular, the work node software object 302 illustrated in FIG. 3 represents a software object that represents a grouping of processing tasks, such as I/O processing, that are handled by a single CPU core at a time. For example, if an I/O chip driver has a collection of resources (e.g., queues, collections, etc.) that are not multicore safe (i.e., are subject to the risk of concurrent access from multiple CPU cores), all of the work for that collection of resources may be combined into a single work node software object 302.

Looking specifically at the example in FIG. 3, a single work node software object 302 is illustrated for demonstration. The single work node software object 302 includes a software object 304 associated with a specific function, such as a driver. For example, the software object 304 may represent an I/O chip driver. More generally, the work node software object 302 represents a firmware component or a collection of unprotected resources (i.e., not multicore safe).

Associated with that software object 304 may be one or more resources, as noted above. The illustration in FIG. 3 includes a first resource 306 and a second resource 308, each illustrated as queues specific to the software object 304 (e.g., a driver). Each queue may include tasks, some or all of which are not multicore safe—in the example of FIG. 3, first resource 306 is a queue that includes tasks 310.a and 310.b, which may represent any number of tasks, and second resource 308 is a queue that includes tasks 312.a and 312.b, which also may represent any number of tasks.

These tasks (310 and 312) associated with the software object 304, wrapped into the work node software object 302, according to embodiments of the present disclosure may be scheduled on any available CPU core together. Thus, the tasks that should be executed together because they are not multicore safe may still be scheduled to any available CPU core without rigid, static assignment to thereby dynamically balance CPU workload among cores in a multicore environment.

As just one example, where the software object 304 represents an I/O chip driver, and therefore is referred to here as I/O chip driver 304, the I/O chip driver 304 wraps the resources 308 and 308 that are associated with that I/O channel into the object. The I/O chip driver 304 is then in turn wrapped into the work node software object 302. Thus, when the I/O chip driver 304 identifies work to be done, it may add the work node software object 302 to a global queue (or queues, as discussed with respect to FIGS. 4A-4C below), rather than a collection of queues dedicated to a given CPU core 204.

When a scheduler for a next-available CPU core 204 arrives on the work node software object 302 in the global queue, the scheduler schedules the work node software object 302 for the next-available CPU core 204. As described herein, the scheduler may refer to multiple schedulers associated with the multiple CPU cores 204, or alternatively to a scheduler that handles scheduling for all or a subset of the CPU cores 204 together.

After the work node software object 302 is scheduled to a given CPU core 204, and the CPU core 204 begins execution of that work node software object 302, the work node software object 302 uses its internal queues and resources to find and process the work it has been assigned to do. Since those internal queues and resources are constrained to the work node software object 302 being processed on the given CPU core 204 (i.e., the CPU core 204 processes the work node software object 302 tasks to completion), multicore protection is not required because the given work node software object 302 will be processed by only one CPU core 204 at a given point in time.

As noted above, the work node software objects 302 are placed onto a global queue (or queues) and are scheduled as next CPU cores 204 become available. Some examples of global queues, and aspects of their use, are illustrated with respect to FIGS. 4A-4C.

Figure 4A:
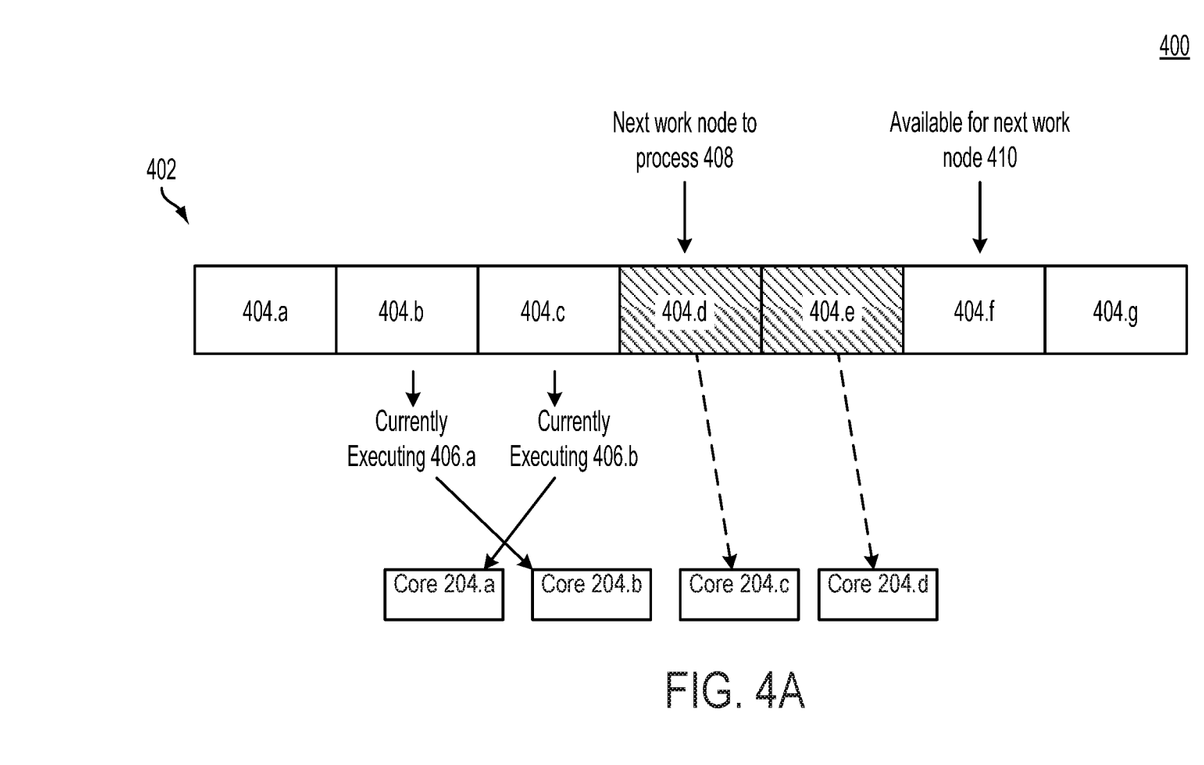
FIG. 4A is an organizational diagram that illustrates operation of a global queue for work node software object assignment according to aspects of the present disclosure.

Looking at FIG. 4A in particular, an organizational diagram 400 illustrates operation of a global queue 402 for work node software object 302 assignment according to aspects of the present disclosure. As illustrated in FIG. 4A, the global queue 402 includes a plurality of slots 404.*a*, 404.*b*, 404.*c*, 404.*d*, 404.*e*, 404.*f*, and 404.*g*. The number of slots 404 is illustrative only; any number of slots 404 may exist in a global queue 402. FIG. 4A illustrates those slots 404 which currently have work node software objects 302 associated with them with hatched lines—specifically, slots 404.*b*, 404.*c*, 404.*d*, and 404.*e* are illustrated as having work node software objects 302 associated therewith at a point in time. The slots 404.*f*, 404.*g*, and 404.*a* (i.e., in a circular queue as queue 402) are available to receive work node software objects 302.

As illustrated, the slot 404.*d* has pointing to it the consumer index 408 (the index being just one example of approaches to tracking position in the queue 402 of which work node software objects 302 are next available for processing), which identifies the next slot with a work node software object 302 that an available CPU core 204 can schedule and process. Further, the slot 404.*f* has pointing to it the producer index 410 (the index being just one example of approaches to tracking position for where to place new work node software objects 302 for scheduling), which identifies the next slot available to receive a new work node software object 302 for scheduling.

Also illustrated in FIG. 4A are the CPU cores 204.*a*, 204.*b*, 204.*c*, and 204.*d* introduced in FIG. 2 for purposes of discussion. In this example, CPU core 204.*b* recently became available and, upon checking the queue 402 when the CPU core 204.*b*'s scheduler process runs, determined that the work node software object 302 placed at slot 404.*b* was the next available slot in the queue 402 at that time (i.e., the consumer index 408 pointed to it at that time). Therefore, the CPU core 204.*b*'s scheduler pulled the work node software object 302 and is currently executing it (406.*a*) (and the consumer index 408 shifted to slot 404.*c*). This may involve, for example, calling a process method on the work node software object 302, in response to which the work node software object 302 evaluates any internal queues and, via the CPU core 204.*b*, executes (processes) any tasks present there.

Continuing with this example, after the CPU core 204.*b* scheduled the work node software object 302 from slot 404.*b*, the CPU core 204.*a* became available and, upon checking the queue 402, determined that the work node software object 302 placed at slot 404.*c* was the next available at that time (i.e., the consumer index 408 at the later point in time). Therefore, the CPU core 204.*a*'s scheduler pulled the work node software object 302 associated with slot 404.*c* and is currently executing it (406.*b*) (and the consumer index 408 shifted to its present location in this example, slot 404.*d*).

Thus, at the present point in time, the consumer index 408 is pointing to slot 404.*d* and the work node software object 302 associated therewith is the next available work node for processing. As illustrated, both CPU cores 204.*c* and 204.*d* become available and may schedule new work node software objects 302. During this time, additional work node software objects 302 may be added to the queue 402 at the location identified by the producer index 410. Once a new work node software object 302 is added at the slot 404.*f* (as illustrated in FIG. 4A's example), the producer index 410 may shift to the next slot, here slot 404.*g*. Further, in the embodiment illustrated when the producer index 410 is again ready to shift, next from slot 404.*g*, it may wrap to the start of the queue again at slot 404.*a* and proceed from there.

By allowing the consumer and producer indexes 408, 410 to point to different slots in the queue 402, it is not necessary to perform some form of multicore lock when removing work node software objects 302 from the queue 402 because other CPU cores 204 may be adding work node software objects 302 at a different queue index.

Figure 4B:
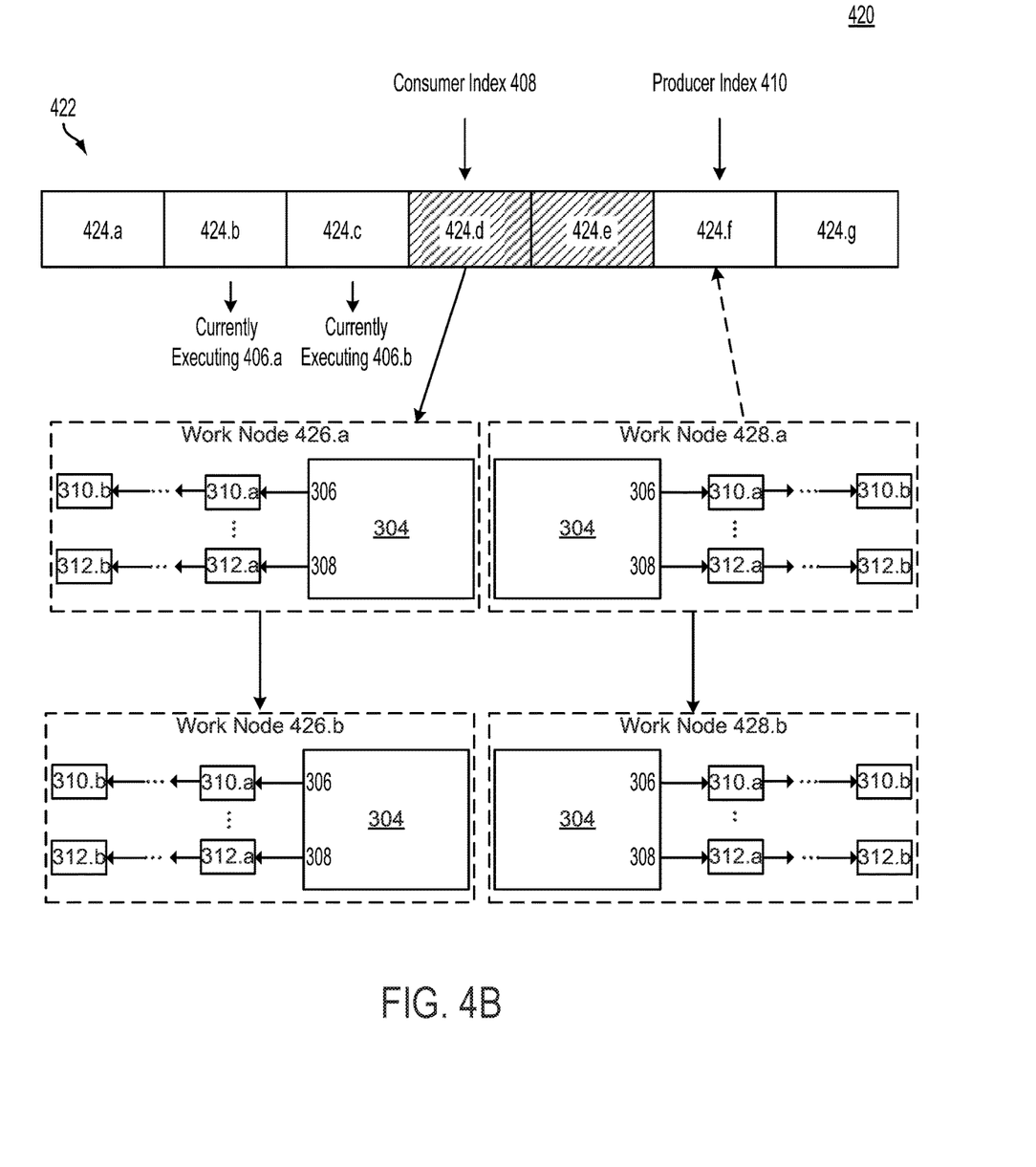
FIG. 4B is an organizational diagram that illustrates operation of a global queue for work node software object assignment according to aspects of the present disclosure.

FIG. 4B illustrates another queue type that may be implemented according to embodiments of the present disclosure. Specifically, FIG. 4B illustrates an organizational diagram 420 of operation of a global queue 422 for work node software object 302 assignment according to aspects of the present disclosure. The differences between FIGS. 4B and 4A will be discussed to illustrate.

The global queue 422 is a collection of multicore-safe queues. Each multicore-safe queue has a queue head 424. Although analogous to the slots 404 of FIG. 4A, each queue head 424 may indicate the head of potentially multiple work node software objects 302 linked together into a single queue, all within the queue 422. FIG. 4B illustrates multiple queue heads 424: queue head 424.*a*, 424.*b*, 424.*c*, 424.*d*, 424.*e*, 424.*f*, and 424.*g*. The number of queue heads 424 is illustrative only; any number of queue heads 424 may exist in a global queue 422.

Looking at the current queue head 424.*d* to which the consumer index 408 points, as illustrated there are two work node software objects 302, identified here as work node software objects 426.*a* and 426.*b*, associated with the queue head 424.*d*. The queue head 424.*d* points to the work node software object 424.*a*, which in turn points to the work node software object 426.*b*. This can therefore be viewed as a multicore-safe queue that is, itself, a part of the global queue 422. When the consumer index 408 reaches the queue head 424.*d*, the next available CPU core 204 schedules the queue head 424.*d* for processing—as a result, the next available CPU core 204 schedules and executes all of the work node software objects 302 (here, 426.*a* and 426.*b*) associated with the given queue head 424 before becoming available again. In addition, with the queue head 424.*d* scheduled, the consumer index 408 shifts to the next queue head, in this example 424.*e*.

During this time, additional work node software objects 302 may be added to the queue 422 at the location identified by the producer index 410. In the example illustrated in FIG. 4B, the producer index 410 is pointing to queue head 424.*f*. Thus, when work node software object 428.*a* is sought to be added to the global queue 422 (i.e., by a software application indicating a need to schedule it for processing), it is added to queue head 424.*f* because that is where the producer index 410 is currently pointing. When a next work node software object 428.*b* is to be added to the global queue 422, because the producer index 410 still points to the same queue head 424.*f*, the work node software object 428.*b* is added in association to the same queue head 424.*f*. This is in contrast to FIG. 4A, where the producer index 410 shifts each time a work node software object 302 is added to a slot 404. Depending upon the approach taken, more work node software objects 302 may still be added under the same queue head 424.*f* before the producer index 410 is shifted to the next queue head 424, in this example 424.*g*.

For example, the producer index 410 may be triggered to shift in response to the consumer index 408 shifting to where the producer index 410 currently points. In other words, if the producer index 410 were pointing to queue head 424.*f*, and the consumer index 408 (pointing to where the next available CPU core 204 will pull its work from) were pointing to queue head 424.e, then in response to an available CPU core 204 pulling the work node software object (or objects) 302 associated with queue head 424.e, the consumer index 408 shifts to queue head 424.f. Since this would cause overlap between consumer and producer indexes, the producer index 410 shifts in response to the consumer index 408 shift.

As another example, a threshold number of work node software objects 302 may be set for each queue identified by a queue head 424 in the global queue 422. For example, if the threshold is set to two, then once a second work node software object 302 is added to be associated with a particular queue head 424, the producer index 410 shifts to the next available queue head 424.

As yet another example, weights may be used to enable a determination on when to shift the producer index 410. As an example use of weights, each work node software object 302 may have a particular weight associated with it, and as work node software objects 402 are added to be associated with a particular queue head 424, the weights may be added together of each of the work node software objects 302 already associated with the particular queue head 424. Once the combined weights reach a particular threshold, the producer index 410 may be shifted so that any given CPU core 204 that schedules a queue head 424 (and, therefore, all of the work node software objects 302 associated therewith) is not disproportionately burdened in processing.

The weight may be a static weight or a dynamic weight. For example, a static weight may be assigned to a work node software object 302 when the object is instantiated, and be based on the type of software object 304 (FIG. 3) being included in that work node software object 302 (i.e., a prediction of workload based on the type of software object 304). Alternatively or in addition, the weight may be dynamically adjusted depending on the actual types of work/tasks and resources included with a given software object 304. That is, when a queue is added to a software object 304, a first weight may be added to describe a weight for the work node software object 304. A second weight may be added in relation to a different queue or resource. These may aggregate over time and, when the work node software object 302 with the dynamic weight is ready for scheduling to be processed, the dynamic weight may become fixed.

As the work node software objects 302 are added to the global queue 422, the weights may combine and be compared against a threshold weight total. Once that threshold weight total is met, the producer index 410 may shift to the next queue head 424 to begin the process again.

Figure 4C:
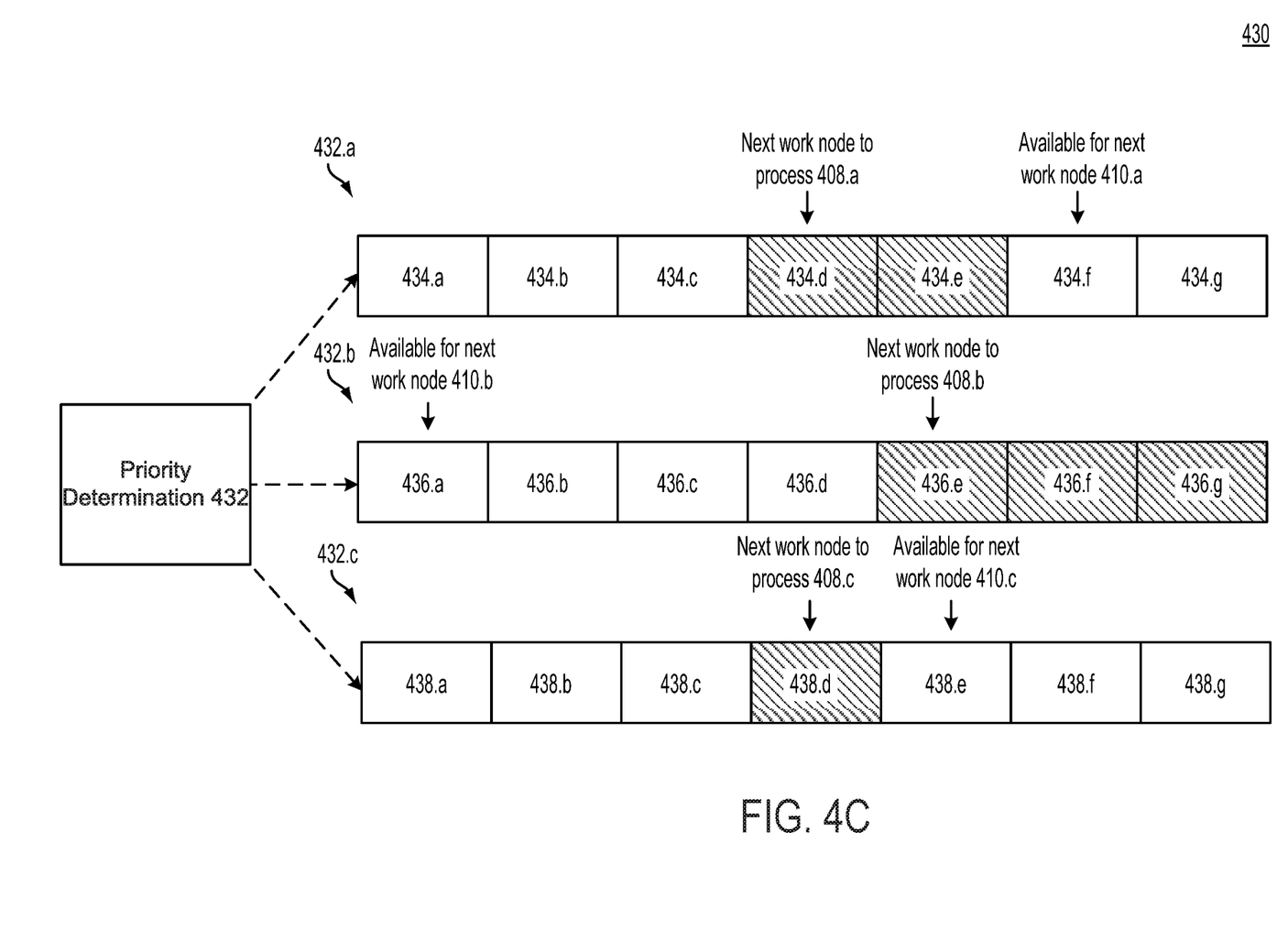
FIG. 4C is an organizational diagram that illustrates operation of a global queue for work node software object assignment according to aspects of the present disclosure.

As another alternative global queue implementation, FIG. 4C illustrates a queue type that may be implemented according to embodiments of the present disclosure. Specifically, FIG. 4C illustrates an organizational diagram 430 of operation of a global tiered queue for work node software object 302 assignment according to aspects of the present disclosure. The differences between FIGS. 4C, 4B, and 4A will be discussed to illustrate.

The global queue illustrated in FIG. 4C is composed of a plurality of queue tiers 432. In the example of FIG. 4C, three queue tiers 432.a, 432.b, and 432.c are illustrated though any number of tiers may be implemented. As illustrated, each queue tier 432 is implemented as a "simple queue" similar to that identified in FIG. 4A—thus, after a work node software object 302 is added to a slot (434, 436, or 438) the respective producer index 410 shifts to the next slot. Alternatively, one, some, or all of the queue tiers 432 may be implemented as respective collections of multicore-safe queues as laid out in FIG. 4B.

As illustrated, there is a priority determination 432 that assigns a priority to each work node software object 302 that is to be placed onto the global queue. This may be done, for example, based on the nature of the software object 304 which is wrapped in the work node software object 302. For example, a software object 304 associated with an I/O path that is more critical than other applications may receive a higher priority than another software object 304. This may be done as the wrapping occurs or once it is being sent for queuing, as a characteristic of the object.

According to the illustration in FIG. 4C, if the given work node software object 302 receives the highest priority, it is assigned to the first queue tier 432.a. From that assignment, the work node software object 302 is then placed at the slot 434 of first queue tier 432.a where the producer index 410 is currently pointing (in this example, 434.f). If the work node software object 302 receives a middle priority, it is assigned to the second queue tier 432.b, which in this example is lower in priority than first queue tier 432.a. Finally, if the work node software object 302 receives the lowest priority, then the work node software object 302 is assigned to the third queue tier 432.c, which in this example is lower in priority than first queue tier 432.a and second queue tier 432.b.

In some embodiments, the higher queue tiers 432 may take precedence when CPU cores 204 become available over lower queue tiers 432. Alternatively, tracking mechanisms may ensure that work node software objects 302 assigned to each queue tier 432 have opportunity for scheduling. For example, a threshold number of scheduling events may be assigned to each queue tier 432, such that once enough work node software objects 302 have been scheduled from the current queue tier 432, scheduling is shifted to the next queue tier 432 below the current queue tier 432, where tracking again occurs against a threshold number for that tier. Once the lowest tier is reached, scheduling may again shift to the top queue tier 432. For example, the first queue tier 432.a may have a larger threshold number than the second queue tier 432.b, which in turn may have a larger threshold number than the third queue tier 432.c. Thus, the higher queue tiers 432 receive more priority than lower tiers.

Of the above alternatives illustrated in FIGS. 4A, 4B, and 4C, where there are many CPU cores 204, it may be useful to implement the global queue as illustrated in FIG. 4A, while with fewer CPU cores 204 the global queue alternatives illustrated in FIGS. 4B and 4C may be useful.

Figure 5:
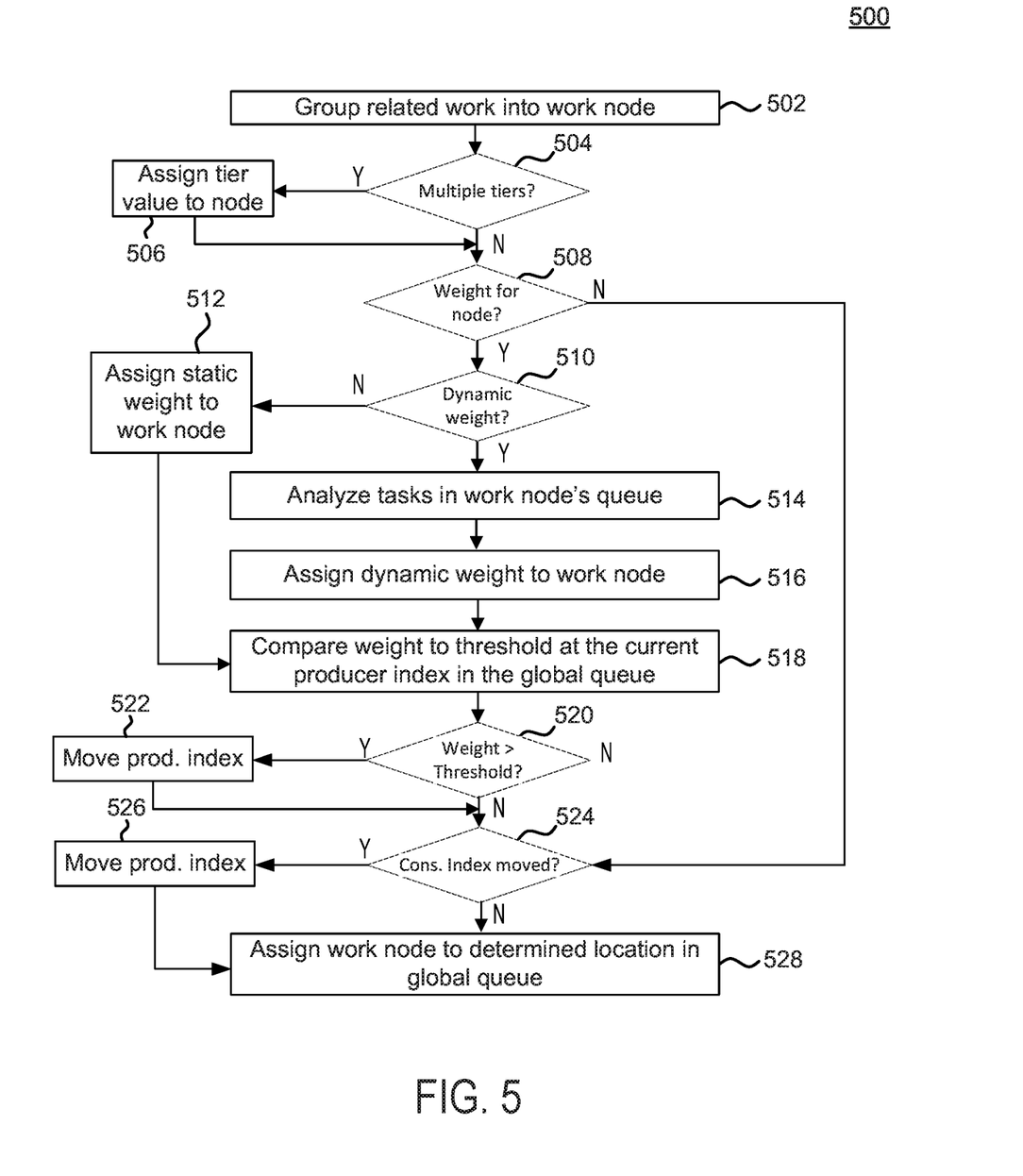
FIG. 5 is a flow diagram of an exemplary method of queuing work node software objects according to aspects of the present disclosure.

Turning now to FIG. 5, a flow diagram is illustrated of a method 500 for queuing work node software objects according to aspects of the present disclosure. In an embodiment, the method 500 may be implemented by one or more processors of one or more of the storage controllers 108 of the storage system 102, executing computer-readable instructions to perform the functions described herein with respect to the work node software objects 302 and global queues (402/422/432). In the description of FIG. 5, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 500, and that some of the steps described can be replaced or eliminated for other embodiments of the method 500.

At block 502, the storage controller 108 under direction of an application (e.g., application 214 or operating system 216) groups related tasks into a work node software object 302. For example, queues with tasks related to a same software object 304 are wrapped into the same work node software object 302. This may be done in response to the application 214/operating system 216 being ready to schedule I/O processing work.

At decision block 504, if the global queue includes multiple tiers (i.e., as described with respect to FIG. 4C above), then the method proceeds to block 506.

At block 506, a tier value is assigned to the work node software object 302. The method 500 then proceeds to decision block 508.

Returning to decision block 504, if there are not multiple tiers, then the method 500 proceeds to decision block 508 by bypassing block 506.

At decision block 508, if weights are associated with the work node software objects 302 (e.g., because the global queue is implemented according to FIG. 4B's example), then the method proceeds to decision block 510.

At decision block 510, if the weight is not dynamic (i.e., changed based on the types of tasks actually added to a work node software object 302), then the method 500 proceeds to block 512.

At block 512, the storage controller 108 assigns a static weight to the work node software object 302, for example based on the type of work normally associated with the given object.

Returning to decision block 510, if the weight is dynamic, then the method 500 proceeds to block 514.

At block 514, the storage controller 108 analyzes the tasks that are being placed in the work node software object 302, for example in the one or more specific queues associated with the software object(s) 304 for that work node software object 302.

At block 516, the storage controller 108 assigns a dynamic weight to the work node software object 302 that is based on the actual type of work, and the rated burden of that work on the CPU core 204 eventually scheduled to execute it. This may be an aggregation of individual weights associated with each task added (or resource, queue of tasks, etc.). With the weight associated, the work node software object 302 is ready to be added to the global queue (402/422/432 depending upon solution taken).

At block 518, the storage controller 108 compares the weight assigned to the work node software object 302 at block 516 against a threshold weight value for the slot 404/queue head 424 at which the producer index 410 currently points. This may include, for example, taking the weight values for any other work node software objects 302 already assigned to the current queue head 424 and combining with the determined weight of the new work node software object 302.

At decision block 520, if that value from block 518 is greater than the threshold set for that global queue (e.g., global queue 422 or a given tier for queue tiers 432), then the method 500 proceeds to block 522.

At block 522, the storage controller 108 moves the producer index 410 to point to the next queue head 424 or slot/head 432. From block 522, the method 500 proceeds to decision block 524.

Returning to decision block 520, if the value from block 518 is not greater than the threshold set for that global queue, then the method 500 proceeds to decision block 524 without yet moving the producer index 410.

At decision block 524, the storage controller 108 determines whether the consumer index 408 has moved so that it is now pointing to the same slot 404/queue head 424/slot or queue head 432 (depending upon the particular implementation type of the global queue according to any of FIGS. 4A, 4B, and 4C) as the producer index 410 is currently pointing.

If the consumer index 408 is shifting to point to the same location in the global queue as the producer index 410, then the method 500 proceeds to block 526. At block 526, the storage controller 108 moves the producer index 410 to point to the next slot 404 (FIG. 4A), queue head 424 (FIG. 4B) or slot/queue head 432 (FIG. 4C). From block 526, the method 500 proceeds to block 528.

Returning to decision block 524, if the consumer index 408 has not moved to point to the same location in the global queue as the producer index 410 (i.e., there are multiple locations in the global queue between the two that represent one or more work node software objects 302 still awaiting processing by an available CPU core 204), then the method 500 proceeds to block 528 without moving the producer index 410.

At block 528, the storage controller 108 assigns the pending work node software object from block 502 to the determined location in the global queue as identified by the current location pointed to by the producer index 410.

Returning to decision block 508, if weights are not associated with the work node software objects 302, then the method 500 proceeds to decision block 524 and proceeds as described above. Although the method 500 in FIG. 5 illustrates the various queuing mechanisms from FIGS. 4A, 4B, and 4C, the method 500 may be simplified depending on which particular implementation the user of the storage system 102 selects/is provided with (e.g., tiers, weights, queue heads, queue slots, etc.).

Figure 6:
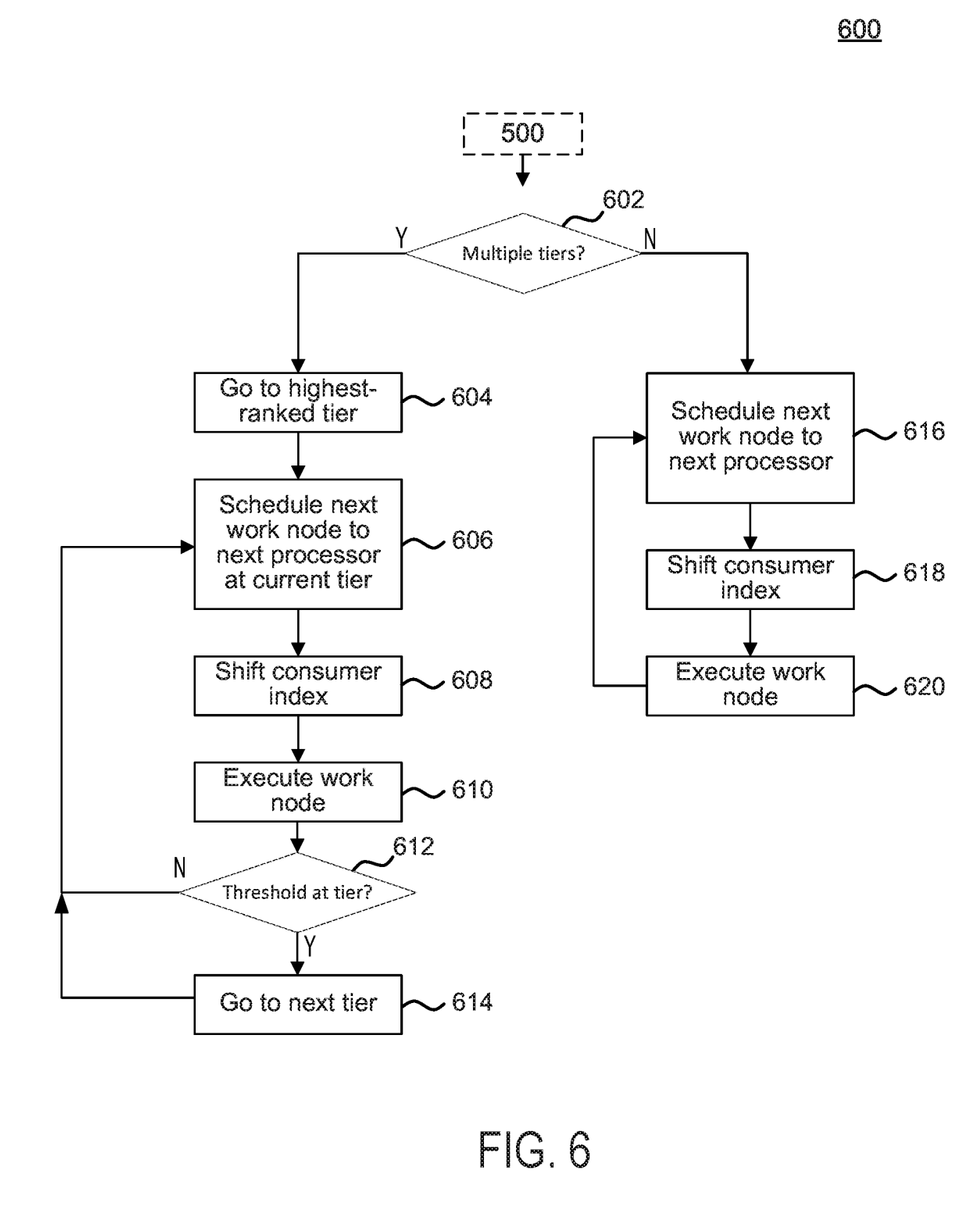
FIG. 6 is a flow diagram of an exemplary method of opportunistically scheduling work node software objects according to aspects of the present disclosure.

For example, FIG. 6 is a flow diagram of a method 600 for opportunistically scheduling work node software objects according to aspects of the present disclosure. In an embodiment, the method 600 may be implemented by one or more processors of one or more of the storage controllers 108 of the storage system 102, executing computer-readable instructions to perform the scheduling functions described herein with respect to work node software objects 302 and global queues (402/422/432). In the description of FIG. 6, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 600, and that some of the steps described can be replaced or eliminated for other embodiments of the method 600.

As shown in dashed lines, the method 500 runs concurrent to the method 600—in other words, while software objects 304 are periodically (i.e., as-needed) grouped into work node software objects 302, the method 600 for scheduling work node software objects 302 may concurrently take place. Thus, in this discussion, it is understood that work node software objects 302 are also being added at the producer index 410 location as they arise.

At decision block 602, if the global queue includes multiple queue tiers 432, then the method 600 proceeds to block 604.

At block 604, the storage controller 108 goes to the highest-ranked queue tier 432, i.e. queue tier 432.a of FIG. 4C.

At block 606, the storage controller 108 executes a scheduler for the CPU core 204 that is currently available to schedule the next work node software object 302 identified by the current location pointed to by the consumer index 408 of the current queue tier 432 (i.e., at the first queue tier 432.a, by the consumer index 408.a). If the queue tier 432 implements queue heads 424 as discussed with respect to FIG. 4B, then the scheduling is of the queue head 424 and therefore of all of the work node software objects 302 associated with that queue head 424.

At block 608, the storage controller 108 shifts the consumer index 408 of the current queue tier 432 (i.e., at the first queue tier 432.a, the consumer index 408.a is shifted) after the scheduler process for the available CPU core 204 pulls the work node software object 302 (the scheduling performed at block 606).

At block 610, the storage controller 108 processes, or executes, the tasks and resources that were wrapped into the scheduled work node software object 302.

At decision block 612, the storage controller 108 determines whether a threshold number of scheduling events has occurred at the current queue tier 432. If not, then the method 600 returns to block 606 to schedule the next work node software object 302 (or objects, depending on whether queue head or slot is used) and proceeds as described above and below.

If, at decision block 612, the storage controller 108 determines that a threshold number of scheduling events has occurred for the current queue tier 432, then the method proceeds to block 614.

At block 614, the storage controller 108 shifts to the next queue tier 432 (i.e., from queue tier 432.a to 432.b when the threshold is met, and from queue tier 432.c back to 432.a according to the example number of tiers in FIG. 4C). The method 600 then returns to block 606 and proceeds as discussed above.

Returning to decision block 602, if the global queue does not include multiple queue tiers 432, then the method 600 proceeds to block 616.

At block 616, the storage controller 108 executes a scheduler for the CPU core 204 that is currently available to schedule the next work node software object 302 identified by the current location pointed to by the consumer index 408 (whether a slot 404 or queue head 424). If the consumer index points to queue heads 424 as discussed with respect to FIG. 4B, then the scheduling is of the queue head 424 and therefore of all of the work node software objects 302 associated with that queue head 424.

At block 618, the storage controller 108 shifts the consumer index 408 of the global queue after the scheduler process for the available CPU core 204 pulls the work node software object 302 (the scheduling performed at block 616).

At block 618, the storage controller 108 processes, or executes, the tasks and resources that were wrapped into the scheduled work node software object 302.

The method 600 then returns to block 616 and continues processing as additional work node software objects 302 are added to the global queue according to the method 500 and as CPU cores 204 become available for scheduling. Again, although the method 600 in FIG. 6 illustrates the various queuing mechanisms from FIGS. 4A, 4B, and 4C, the method 600 may also be simplified depending on which particular implementation the user of the storage system 102 selects/is provided with (e.g., tiers, weights, queue heads, queue slots, etc.).

As a result of the elements discussed above, embodiments of the present disclosure improve upon storage system technology. For example, embodiments of the present disclosure enable the storage system 102 to more efficiently process I/O by dynamically balancing CPU workload to under-utilized CPU cores. Further, and because of this, the storage system 102 may more efficiently execute non-SMP applications in a multicore environment, even where the tasks do not enjoy multicore protection. This therefore allows the use of multiple CPU cores in order to provide higher storage system performance while utilizing CPU resources in a more balanced fashion.

In some embodiments, the computing system is programmable and is programmed to execute processes including the processes of methods 500 and/or 600 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

combining, by a storage controller, a plurality of processing tasks that are incompatible with concurrent access by multiple central processing unit (CPU) cores into a work node software object that allows all of the plurality of processing tasks to be executed by a single CPU core without multicore protection, wherein the work node software object is a single object to be placed in and pulled from a global queue, the multiple CPU cores comprising a first CPU core and a second CPU core;

placing, by the first CPU core of the storage controller, the work node software object onto the global queue accessible for processing by any of the first and second CPU cores of the storage controller;

scheduling, by the storage controller, the work node software object to a next available core from among the first and second CPU cores, the work node software object representing a grouping of the plurality of processing tasks so that the plurality of processing tasks are solely handled by the next available core; and processing, by the next available core of the storage controller, the work node software object to completion of the plurality of processing tasks before allowing another task to run on that core.

2. The method of claim 1, wherein the global queue comprises a plurality of tiered queues, the placing further comprising:

assigning, by the storage controller, the work node software object to a first tier queue from among the plurality of tiered queues, each tiered queue corresponding to a different priority level.

3. The method of claim 1, wherein the global queue comprises a collection of queues including a first queue head identified by a consumer index, each queue being configured to receive one or more work node software objects, and a second queue head identified by a producer index, the consumer index following the producer index.

4. The method of claim 1, further comprising:
shifting, by the storage controller, a producer index in response to a threshold number of work node software objects being met, the threshold number being greater than one.

5. The method of claim 1, further comprising:
shifting, by the storage controller, a producer index in response to a weight of the work node software object reaching a threshold value.

6. The method of claim 1, wherein the work node software object comprises a plurality of queues associated with the plurality of processing tasks.

7. A non-transitory machine-readable medium having stored thereon instructions for performing a method comprising machine executable code which, when executed by at least one machine, causes the machine to:
combine a plurality of processing tasks that are incompatible with concurrent access by a plurality of central processing unit (CPU) cores into a first work node software object that allows all of the plurality of processing tasks to be executed by a single CPU core without multicore protection, wherein the first work node software object is a single object to be placed in and pulled from a global queue;
place, by a first CPU core of the plurality of CPU cores, the first work node software object into a first slot of the global queue identified by a producer index, the global queue accessible for processing by any of the plurality of CPU cores of the machine including the first CPU core;
execute, by a second CPU core of the plurality of CPU cores, a second work node software object already in a second slot of the global queue and identified by a consumer index, the consumer index following the producer index; and
schedule the first work node software object to a next available core from among the plurality of CPU cores, including the first CPU core and the second CPU core, in response to incrementing the consumer index to the first slot, the first work node software object representing a grouping of the plurality of processing tasks so that the plurality of processing tasks are solely handled by the next available core; and
processing, by the first CPU core, the first work node software object to completion of the plurality of processing tasks before allowing another task to run on the first CPU core.

8. The non-transitory machine readable medium of claim 7, wherein the global queue comprises a plurality of tiered queues, further comprising machine executable code that causes the machine to:
assign the first work node software object to a first tier queue from among the plurality of tiered queues, each tiered queue corresponding to a different priority level.

9. The non-transitory machine readable medium of claim 7, wherein:
the non-transitory machine readable medium further comprising machine executable code that causes the machine to process, by the next available core, a queue from the global queue comprising the first work node software object to completion before becoming available for scheduling to process a next queue identified by the consumer index.

10. The non-transitory machine readable medium of claim 7, further comprising machine executable code that causes the machine to:
shift the producer index from the first slot to a next slot comprising a next queue in response to the consumer index shifting to the first slot.

11. The non-transitory machine readable medium of claim 7, further comprising machine executable code that causes the machine to:
shift the producer index from the first slot with the global queue comprising the first work node software object to a next slot comprising a next work node software object in response to a weight of the first work node software object reaching a threshold value.

12. The non-transitory machine readable medium of claim 7, wherein the first work node software object comprises a plurality of queues associated with the plurality of processing tasks.

13. A computing device comprising:
a memory containing machine readable medium comprising machine executable code having stored thereon instructions for performing a method of multicore processing;
a plurality of processors coupled to the memory, the plurality of processors configured to execute the machine executable code to cause the plurality of processors to:
combine a plurality of processing tasks that are incompatible with concurrent access by a plurality of central processing unit (CPU) cores of the plurality of processors into a work node software object that allows all of the plurality of processing tasks to be executed by a single CPU core without multicore protection,
wherein the work node software object is a single object to be placed in and pulled from a global queue; place, by a first CPU core of the plurality of CPU cores, the work node software object onto the global queue accessible by the plurality of CPU cores including the first CPU core;
schedule the work node software object to a next available core from among the plurality of CPU cores including the first CPU core, the work node software object representing a grouping of the plurality of processing tasks so that the plurality of processing tasks are solely handled by the next available core; and
process, by the next available core, the work node software object to completion of the plurality of processing tasks without requiring multicore protection and before allowing another task to run on that core.

14. The computing device of claim 13, wherein:
the machine executable code further causes the plurality of processors to assign the work node software object to a first tier queue from among a plurality of tiered queues of the global queue, each tiered queue corresponding to a different priority level.

15. The computing device of claim 13, wherein the machine executable code further causes the plurality of processors to:
schedule, prior to scheduling the work node software object, a prior work node software object already placed onto the global queue and identified by a consumer index, the global queue comprising a collection of queues including a first queue head identified by the consumer index, each queue being configured to receive one or more work node software objects.

16. The computing device of claim 13, wherein the machine executable code further causes the plurality of processors to:
shift a producer index in response to a consumer index shifting based on another next available core from among the plurality of processors.

17. The computing device of claim 13, wherein the machine executable code further causes the plurality of processors to:
shift a producer index in response to a weight of the work node software object reaching a threshold value.

18. The computing device of claim 13, wherein the work node software object comprises a plurality of queues associated with the plurality of processing tasks.

* * * * *